UNITED STATES PATENT OFFICE.

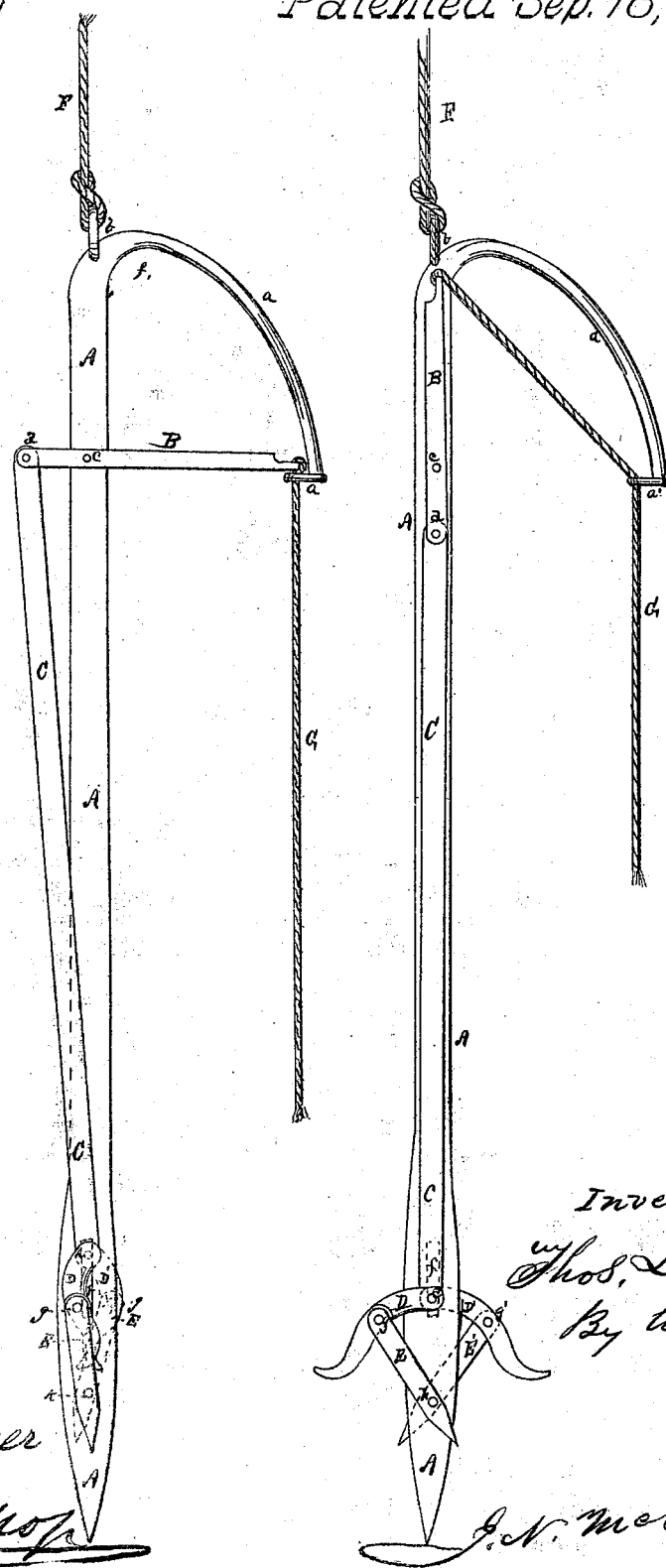

THOMAS LLOYD, OF MUNCY, PENNSYLVANIA.

IMPROVEMENT IN HORSE HAY-FORKS.

Specification forming part of Letters Patent No. 58,110, dated September 18, 1866.

*To all whom it may concern:*

Be it known that I, THOMAS LLOYD, of Muncy, of Lycoming county, in the State of Pennsylvania, have invented certain new and useful Improvements in Hay-Forks; and I do hereby declare that the following is a full and exact description thereof, reference being had to the accompanying drawings, making part of this specification.

My invention relates to that class of hay-forks which is designed to elevate large quantities of hay, and has for its object to afford for use a simple and effective instrument which will easily penetrate into a mass of material, and, after having its working parts adjusted, lift a large quantity of the material; and to these ends my invention consists in the employment, in combination with the main bar, of hinged or pivoted lifting-fingers operated by means of a supplementary bar and top lever, as will be hereinafter more fully explained.

To enable those skilled in the art to make and use my invention, I will proceed to describe the construction and operation of one of my improved lifting-forks, referring by letter to the accompanying drawings, in which—

Figure 1 is an elevation of the apparatus with its parts adjusted in the position in which they would be preparatory to dropping or inserting the fork into the mass of hay to be elevated; and Fig. 2 is a similar view with the fingers distended, as the apparatus would appear while engaged with the material to be lifted.

In the several figures the same parts are designated by the same letter of reference.

A is the main bar of the fork, which is pointed, as shown, at its lower end, and is bent over at the upper end, (in about a quarter-circle,) as illustrated at $a$, having an eye formed in its extremity, as seen at $a'$. About where the bend commences a hole or eye, $b$, is formed, in which is secured the lower end of the rope or cord F, by which the apparatus is hoisted.

B is the working-lever, which is pivoted at $c$ to the main bar A, and at $d$ to the upper end of bar C. This lever B is pulled down at its end (to draw in the fingers of the fork) by means of a cord, G, fastened to it, and passing down through the eye $a'$ of arm $a$. Near the lower part of main bar A is cut a vertical slot, $f$, in which works a pin, $e$, which is arranged in the lower extremity of bar C, and to the opposite ends of which pin $e$ are pivoted the upper ends of the bent fingers D D'; and near the middle of each of these fingers D and D' is pivoted, by pins $g$ $g'$, the upper end of one of the two short arms E and E', which latter are pivoted at their lower portions, by a pin, $h$, to the main bar A. Each one of the fingers is cut away on its outer face below the pivot $g$ or $g'$, and each of the short arms E is cut away on its inner face above its pivot $h$, so that the lower portions of the fingers can close in under the upper portions of the short arms, as seen at Fig. 1.

The fingers D D', it will be seen, are curved and pointed, so as to present catching and lifting projections when thrown out, as seen at Fig. 2; and it will also be seen that when the parts are closed in, as seen at Fig. 1, the apparatus presents a pointed end and smooth sides, without any obstructions to a ready entrance of the implement into a mass as it descends, while at the same time the distending fingers and arms are so arranged and operated that they can be most effectually forced into such positions as to insure the engagement with a large quantity of hay or other material into which the fork may be plunged.

The operation of my improved fork will be easily understood after what has been already said.

The implement in the condition in which it is shown at Fig. 1 is dropped or forced vertically down into a mass of hay or other similar material. The lever B is then forced up into the position seen at Fig. 2, whereby the mechanism at the lower end of the fork is forced to assume the condition seen at Fig. 2, and the fingers distended into the mass of material. The whole apparatus is now elevated or lifted by means of rope F', or in any other manner, carrying upon its lower end a large quantity of the hay. When the apparatus has been carried to the place at which it is desired to deposit the hay, the operator simply pulls the cord G, drawing down the lever B into the position seen at Fig. 1, whereby the fingers and arms are drawn in, and the mass of material on the end of the fork drops off.

I do not wish to be understood as limiting myself to the precise form or proportions of the mechanism shown; but, having explained my improved lifting-fork, so that those skilled in the art can fully understand my invention,

What I claim as new, and desire to secure by Letters Patent, is—

The employment, in combination with the main bar A, of pivoted fingers D D' and arms E E', operated by means of a vertical rod, C, and lever B, the whole arranged substantially as set forth.

In testimony whereof I have hereunto set my hand and seal this 12th day of July, 1866.

THOS. LLOYD. [L. S.]

In presence of—
 WM. M. RANKIN,
 G. LLOYD.